(12) United States Patent
Hou et al.

(10) Patent No.: US 11,609,130 B2
(45) Date of Patent: Mar. 21, 2023

(54) CANTILEVER FORCE SENSOR

(71) Applicant: UNEO INC., Taipei (TW)

(72) Inventors: Chih-Sheng Hou, Taipei (TW);
Chia-Hung Chou, Taipei (TW)

(73) Assignee: UNEO INC., Taipei (TW)

( * ) Notice: Subject to any disclaimer, the term of this patent is extended or adjusted under 35 U.S.C. 154(b) by 89 days.

(21) Appl. No.: 17/152,668

(22) Filed: Jan. 19, 2021

(65) Prior Publication Data

US 2022/0228931 A1 Jul. 21, 2022

(51) Int. Cl.
*G01L 1/16* (2006.01)

(52) U.S. Cl.
CPC ........................ *G01L 1/16* (2013.01)

(58) Field of Classification Search
CPC ............... H01H 13/807; H01H 13/503; H01H 2001/247; G06F 3/041–0407; G06F 3/03545; G01L 1/16; G01L 1/18
See application file for complete search history.

(56) References Cited

U.S. PATENT DOCUMENTS

| | | | | |
|---|---|---|---|---|
| 4,398,342 A * | 8/1983 | Pitt | ........................ | H01L 43/14 323/368 |
| 5,138,879 A * | 8/1992 | Shofner | ................. | G01L 5/0033 356/429 |
| 5,203,206 A * | 4/1993 | Shofner | .................... | G01N 3/08 73/160 |
| 5,411,919 A * | 5/1995 | Inada | ................... | G01P 15/0802 438/125 |
| 6,121,870 A * | 9/2000 | Ariga | ..................... | H01C 10/12 338/114 |
| 6,646,215 B1 * | 11/2003 | Nelson | ............... | H01H 59/0009 333/262 |
| 6,825,428 B1 * | 11/2004 | Zhang | .................... | B82Y 10/00 200/263 |
| 6,842,097 B2 * | 1/2005 | Hsu | .......................... | H01G 5/18 335/78 |
| 6,946,315 B2 * | 9/2005 | Ikeda | .................. | B81C 1/00611 438/50 |
| 7,053,736 B2 * | 5/2006 | Nelson | ............... | H01H 59/0009 335/70 |
| 7,242,273 B2 * | 7/2007 | Isobe | ...................... | H01P 1/127 335/78 |
| 7,501,920 B2 * | 3/2009 | Yuba | .................... | H01H 50/005 335/78 |
| 7,623,007 B2 * | 11/2009 | Nakatsuka | ............. | H03H 9/173 310/330 |
| 7,726,175 B2 * | 6/2010 | Porter | ...................... | G01N 7/04 73/31.05 |

(Continued)

*Primary Examiner* — Tran M. Tran

(74) *Attorney, Agent, or Firm* — Hauptman Ham, LLP

(57) ABSTRACT

A cantilever force sensor with relatively lower On-Force is disclosed, which comprises a top stack, a bottom stack, and a spacer. The first spacer is configured between the top stack and the bottom stack and configured in a first side of the force sensor. A second side, opposite to the first side, of the top stack, is cantilevered from the bottom stack. When the force sensor is depressed from the top side, the second side of the top stack moves down using the first spacer as a fulcrum. Since the cantilevered side can be easily depressed down so that the On-Force for the force sensor is reduced and hence a force sensor with a relatively higher sensitivity is created.

20 Claims, 26 Drawing Sheets

(56) References Cited

U.S. PATENT DOCUMENTS

| | | | | |
|---|---|---|---|---|
| 7,781,687 B2* | 8/2010 | Scherl | | H01H 13/503 |
| | | | | 200/16 D |
| 7,785,912 B2* | 8/2010 | Zhan | | B81B 3/0021 |
| | | | | 257/E21.456 |
| 7,977,587 B2* | 7/2011 | Rajagopal | | H01H 13/48 |
| | | | | 200/1 B |
| 8,217,738 B2* | 7/2012 | Naito | | H01H 59/0009 |
| | | | | 335/78 |
| 8,289,674 B2* | 10/2012 | Smith | | G11C 23/00 |
| | | | | 361/207 |
| 8,371,174 B2 | 2/2013 | Chen et al. | | |
| 8,748,997 B2* | 6/2014 | Kim | | G01L 1/2206 |
| | | | | 340/407.1 |
| 8,779,315 B2* | 7/2014 | Hou | | H03K 17/9625 |
| | | | | 200/534 |
| 8,993,913 B2* | 3/2015 | Hou | | H01H 13/785 |
| | | | | 200/534 |
| 9,070,499 B2* | 6/2015 | Hou | | H01H 13/83 |
| 9,324,515 B2* | 4/2016 | Krumpelman | | H01H 13/7065 |
| 9,335,840 B1* | 5/2016 | Chou | | G06F 3/0383 |
| 9,677,954 B2* | 6/2017 | Chou | | H01C 10/12 |
| 9,679,713 B2* | 6/2017 | Hou | | H03K 17/9625 |
| 9,762,236 B2* | 9/2017 | Chen | | H03K 17/964 |
| 9,766,725 B2* | 9/2017 | Hou | | G06F 3/03545 |
| 10,088,937 B2* | 10/2018 | Hoen | | G06F 3/0414 |
| 10,234,339 B2* | 3/2019 | Chern | | H02N 1/08 |
| 10,365,737 B2* | 7/2019 | Sah | | G06F 3/041 |
| 10,394,379 B2* | 8/2019 | Sah | | G06F 3/04883 |
| 10,409,391 B2* | 9/2019 | Silvanto | | G06F 3/0231 |
| 10,423,253 B2* | 9/2019 | Ho | | G06F 1/3296 |
| 10,429,254 B2* | 10/2019 | Hou | | G01L 1/14 |
| 10,578,499 B2* | 3/2020 | Picciotto | | G06F 3/016 |
| 10,825,628 B2* | 11/2020 | Lee | | H01H 1/242 |
| 10,852,319 B2* | 12/2020 | Landgraf | | G01L 9/12 |
| 10,866,260 B2* | 12/2020 | Otsuki | | G01C 19/5607 |
| 10,874,475 B2* | 12/2020 | Iceman | | A61B 50/13 |
| 11,150,734 B2* | 10/2021 | Lehmann | | G06F 3/03547 |
| 11,366,493 B2* | 6/2022 | Cao | | G06V 40/13 |
| 2002/0140533 A1* | 10/2002 | Miyazaki | | H01H 59/0009 |
| | | | | 335/78 |
| 2007/0024403 A1* | 2/2007 | Kwon | | H01H 59/0009 |
| | | | | 335/78 |
| 2012/0050335 A1* | 3/2012 | Hou | | G06F 3/0481 |
| | | | | 345/661 |
| 2012/0293491 A1* | 11/2012 | Wang | | G06F 3/0338 |
| | | | | 345/419 |
| 2016/0054184 A1* | 2/2016 | Chou | | H01C 10/12 |
| | | | | 73/862.68 |
| 2017/0283249 A1* | 10/2017 | Dogiamis | | B81C 1/0015 |
| 2020/0348757 A1* | 11/2020 | Forest | | G06F 1/1616 |

* cited by examiner

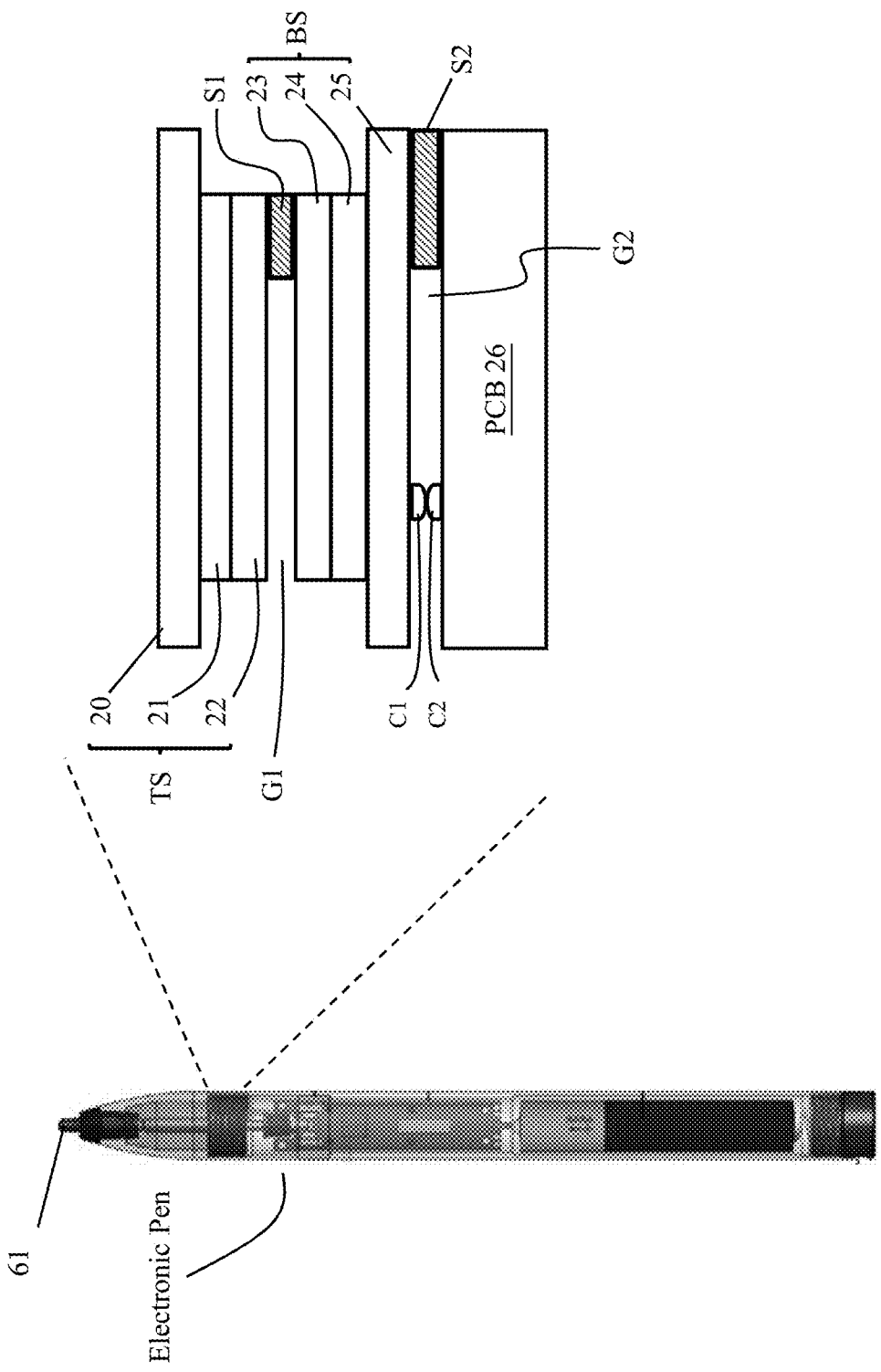

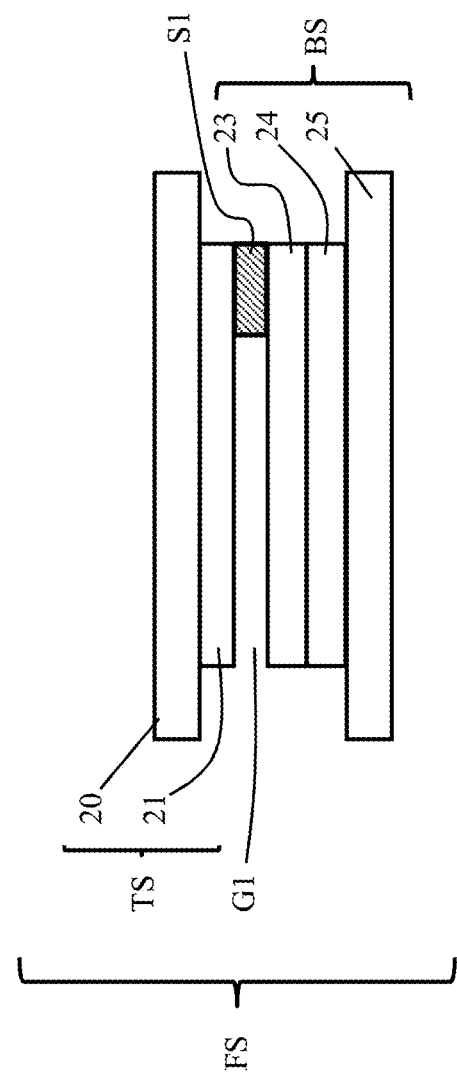

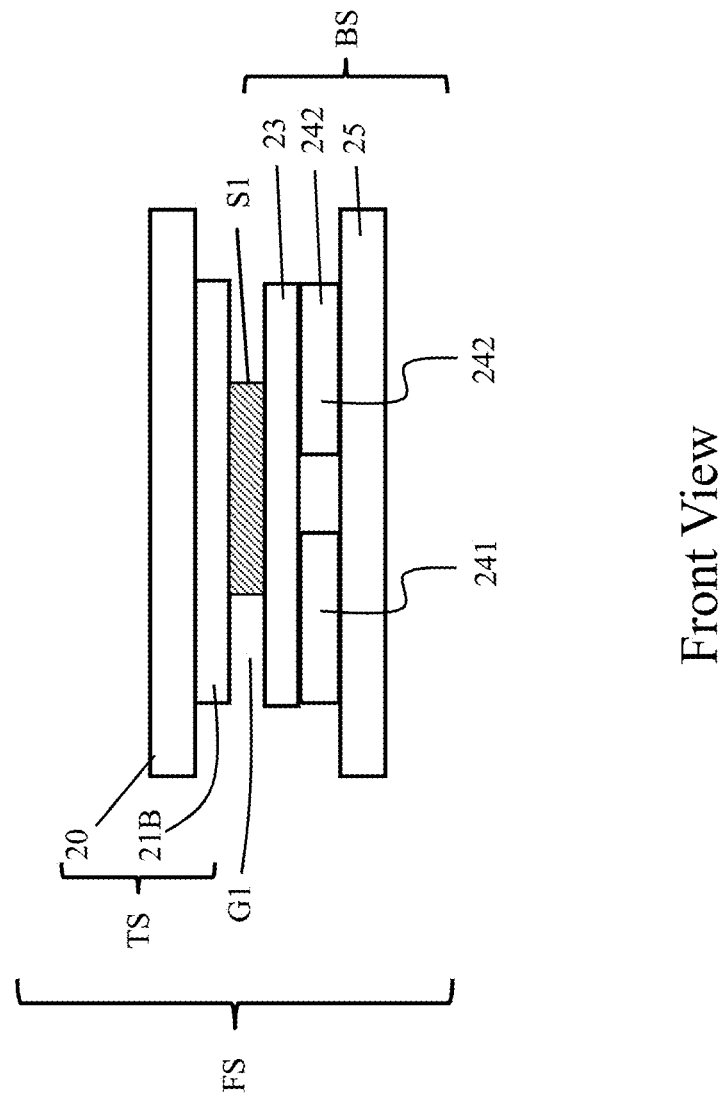

Side View

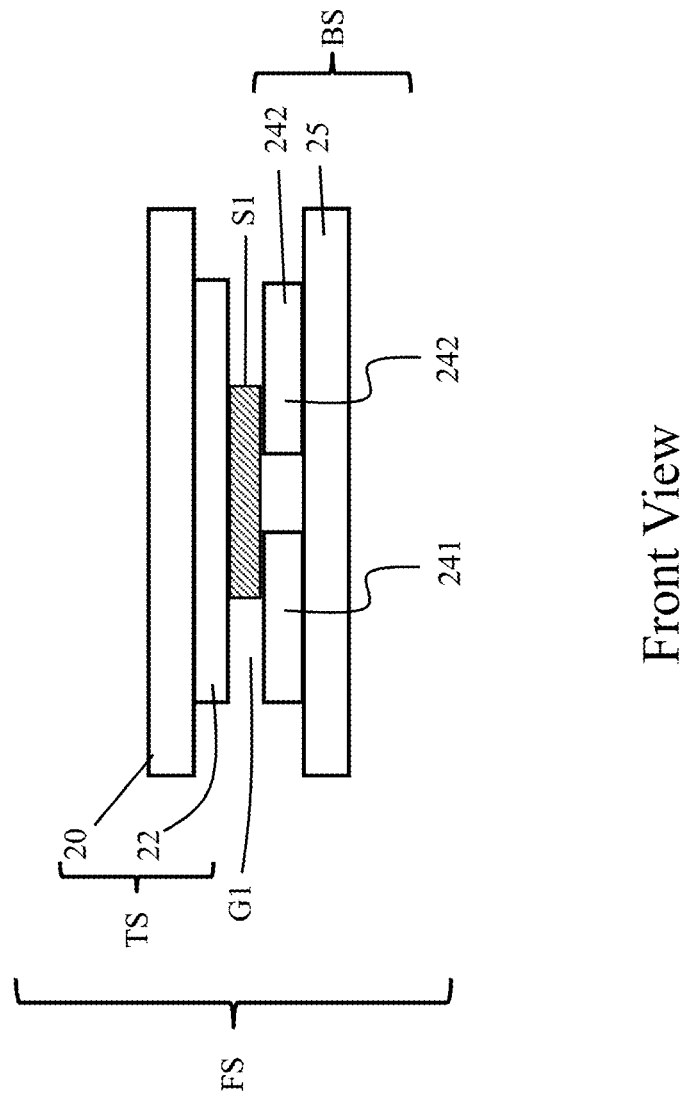

Side View

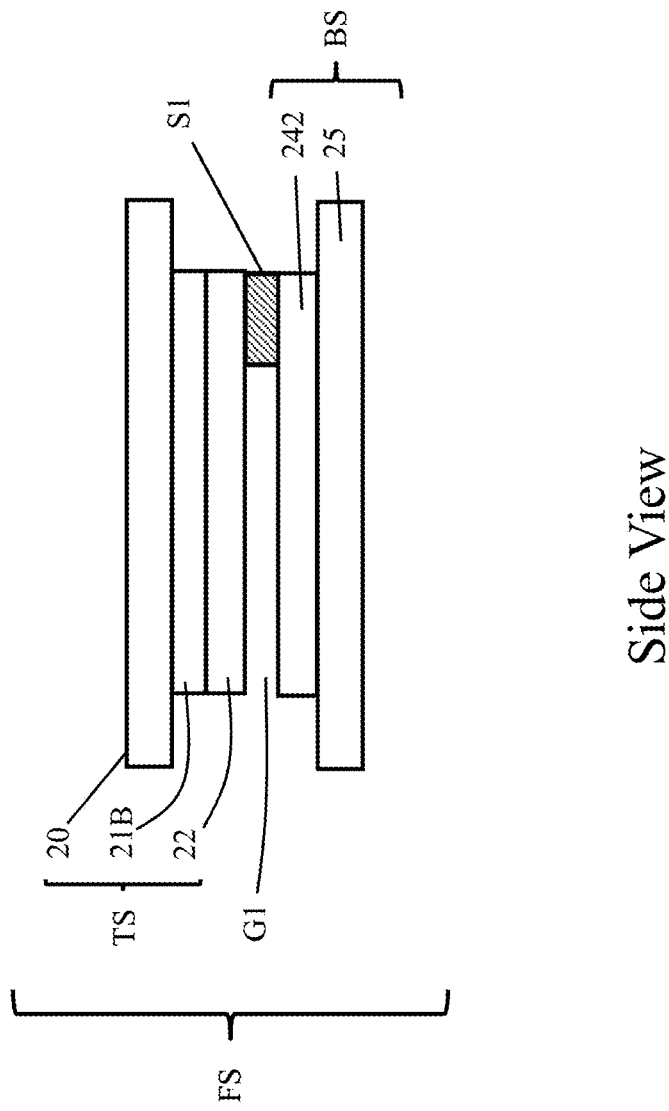

CANTILEVER FORCE SENSOR

BACKGROUND

Technical Field

The present invention relates to a force sensor, especially relates to a cantilever force sensor which can be turned on with a relatively reduced on-force so that a force sensor with higher sensitivity is created.

Description of Related Art

FIG. 1A~1D shows a prior art.

Referring to FIG. 1A as disclosed in U.S. Pat. No. 8,371,174, a conventional force sensor comprises a top substrate 10 and a bottom substrate 109, a top electrode 11 is configured on a bottom side of the top substrate 10. A bottom electrode 119 is configured on the top side of the bottom substrate 109. A top piezoresistive layer 12 is configured on the bottom side of the top electrode 11. A bottom piezoresistive layer 129 is configured on the top side of the bottom electrode 119. A space 16 is formed between the two piezoresistive layers 12, 129. As shown in FIG. 1A, a ring spacer 15 is configured between the substrates 10 and 109. The top electrode 11 and bottom electrode 119 are electrically connected to a circuit system 13.

FIG. 1B shows an EE' section view of the prior art FIG. 1A.

FIG. 1B shows that a ring spacer 15 is configured around the force sensor. The ring spacer 15 resists more against a force applied from the top side of the force sensor.

FIG. 1C shows when a force P is applied to the force sensor of FIG. 1A, the top piezoresistive layer 12 deforms downwardly in the middle portion and contacts the bottom piezoresistive layer 129, at this moment, the piezoresistive layers 12 and 129 have a total thickness of L1. Hence, an output resistance R1 of the force sensor can be determined by the equation $R1=p*L1/A$.

FIG. 1D shows an electricity property for the prior art.

FIG. 1D shows a curve for Conductance/Capacitance vs Force for FIG. 1C. Referring to FIG. 1D a status when the force sensor is depressed from the top side, at the moment of FIG. 1C, an On-Force starts at point P1 which is apparently greater than the zero force point. This is because the ring spacer 15 resists the force applied from the top of the force sensor.

A disadvantage for the prior art is that an On-Force is relatively greater because the ring spacer 15 gives more resistance to the force applied from the top side. It is hopeful for a person skilled in the art to reduce the On-Force so that a force sensor with a higher sensitivity can be obtained.

BRIEF DESCRIPTION OF THE DRAWINGS

FIG. 3 shows the first embodiment configured in an electronic pen according to the present invention.
FIG. 9 shows a seventh embodiment according to the present invention.
FIG. 10A~10B shows an eighth embodiment according to the present invention.
FIG. 11A~11B shows a ninth embodiment according to the present invention.
FIG. 12A~12B shows a tenth embodiment according to the present invention.

DETAILED DESCRIPTION OF THE INVENTION

FIG. 2A~2D shows a first embodiment according to the present invention.

Figure 1B:
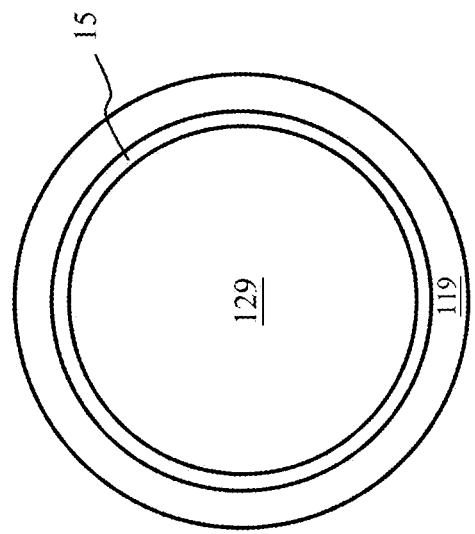
FIG. 1A~1D shows a prior art.
Figure 1A:
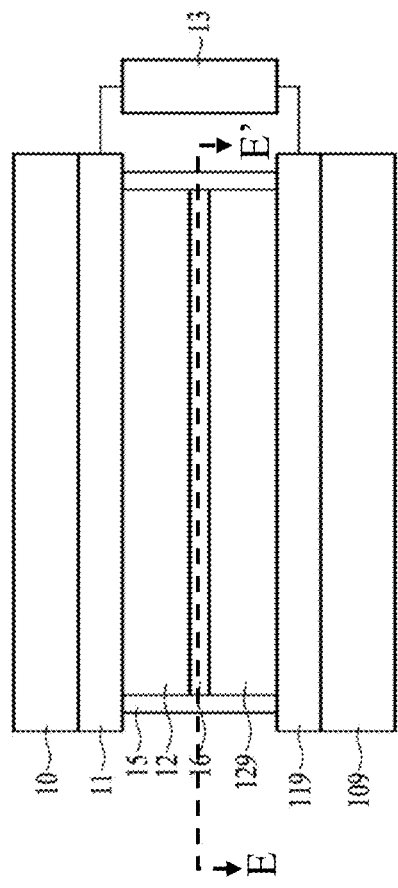
Figure 1C:
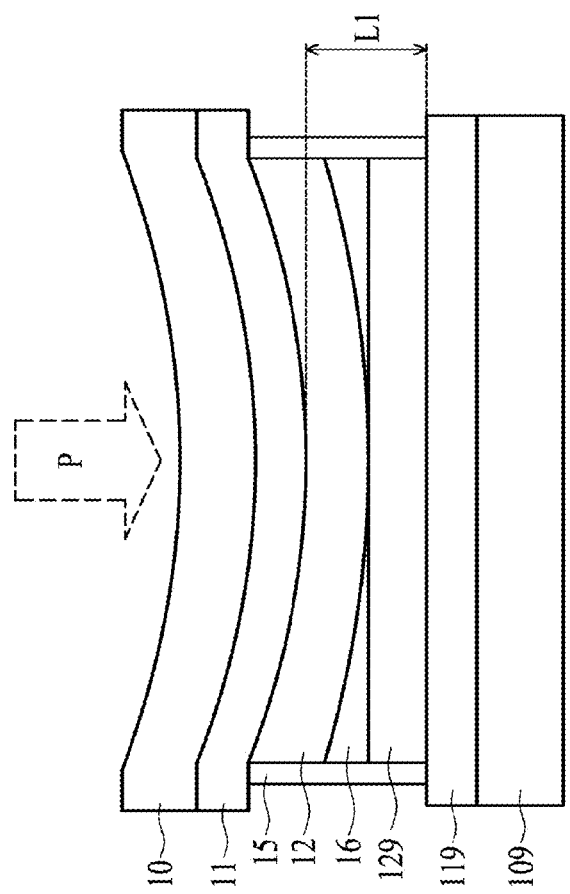
Figure 1D:
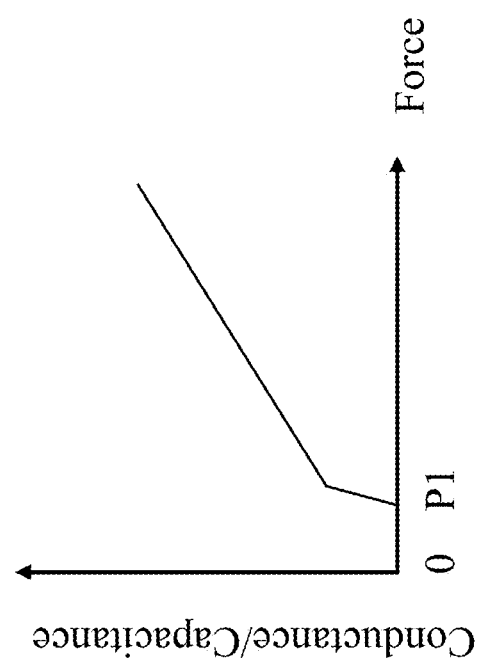
Figure 2A:
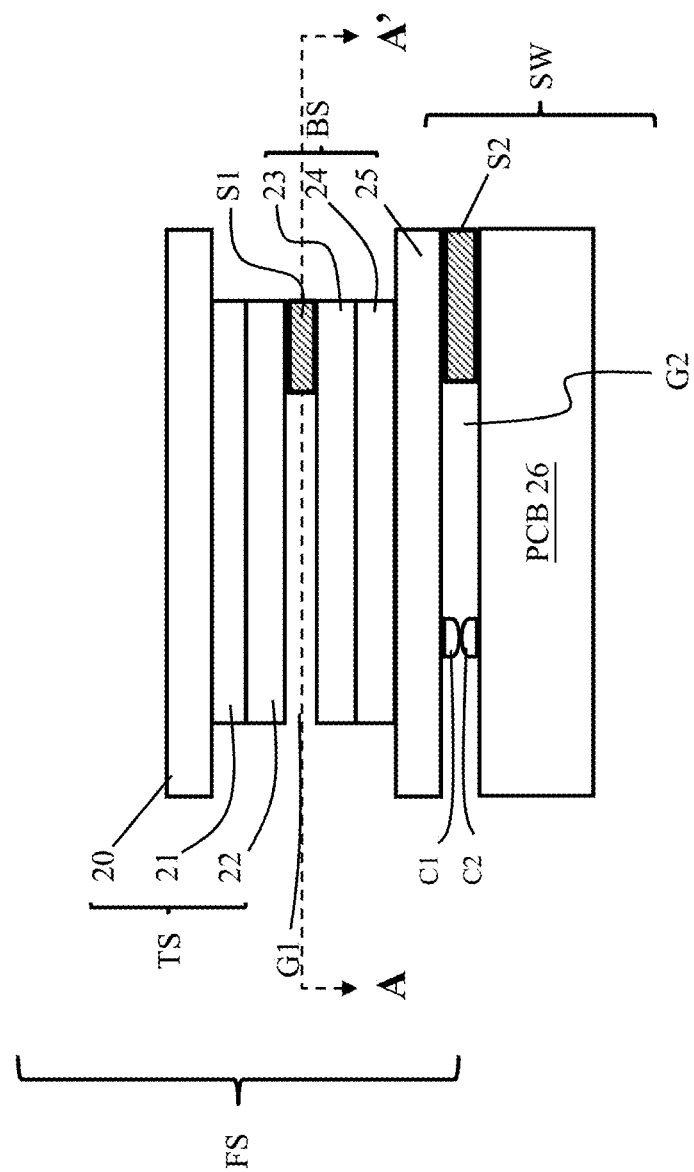
FIG. 2A~2D shows a first embodiment according to the present invention.

FIG. 2A shows a cantilever force sensor FS with a bottom switch SW configured on the bottom side of the force sensor FS. The force sensor FS comprises a top stack TS, a first spacer S1, and a bottom stack BS in sequence. A first gap G1 is configured between the top stack TS and the bottom stack BS. The first spacer S1 is configured in the right side of the force sensor FS. The left side of the top stack TS is cantilevered from the bottom stack BS.

When the force sensor FS is depressed from the top side, the left side of the top stack TS moves down using the first spacer 51 as a fulcrum to turn on the force sensor FS. The first spacer S1 has a top end connected to the top piezo layer 22 of the top stack TS and has a bottom end connected to the bottom piezo electrode 24 of the bottom stack BS.

The top stack TS is comprised of a top substrate 20, a top electrode 21, and a top piezo layer 22 in sequence. The bottom stack BS is comprised of a bottom piezo layer 23, a bottom electrode 24, and a bottom substrate 25 in sequence.

A bottom switch SW is configured on the bottom side of the force sensor FS. A first conductive contact C1 is configured on the bottom side of the bottom stack BS of the force sensor FS. A second conductive contact C2, aligned with the first conductive contact C1, is configured on a top side of a printed circuit board 26 of the bottom switch SW. A second spacer S2 is configured between the bottom substrate 25 and the printed circuit board 26, and the second spacer S2 is configured in the right side of the bottom switch SW. The bottom stack BS, the first conductive contact C1, the second conductive contact C2, and the printed circuit board 26 are configured in sequence to form the bottom switch SW. The delayed turn-on switch is designed for shielding the initial noise signal from the force sensor at an initial stage when it is depressed.

The first conductive contact C1 slightly touches the second conductive contact C2, however without turns on the bottom switch SW. When the force sensor FS is depressed from the top side, the left side of the force sensor FS moves down so that the first conductive contact C1 touches the second conductive contact C2 firmly to turn on the bottom switch SW.

Figure 2B:
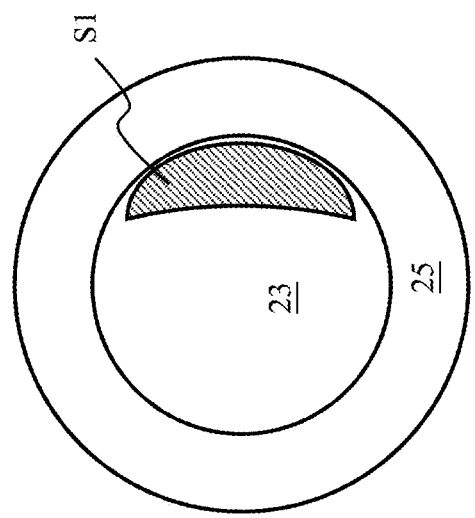

FIG. 2B shows an AA' section view of FIG. 2A according to the present invention. The first spacer S1 is configured in the right side of the force sensor FS, and configured between the top stack TS and the bottom stack BS of the force sensor FS.

Figure 2C:
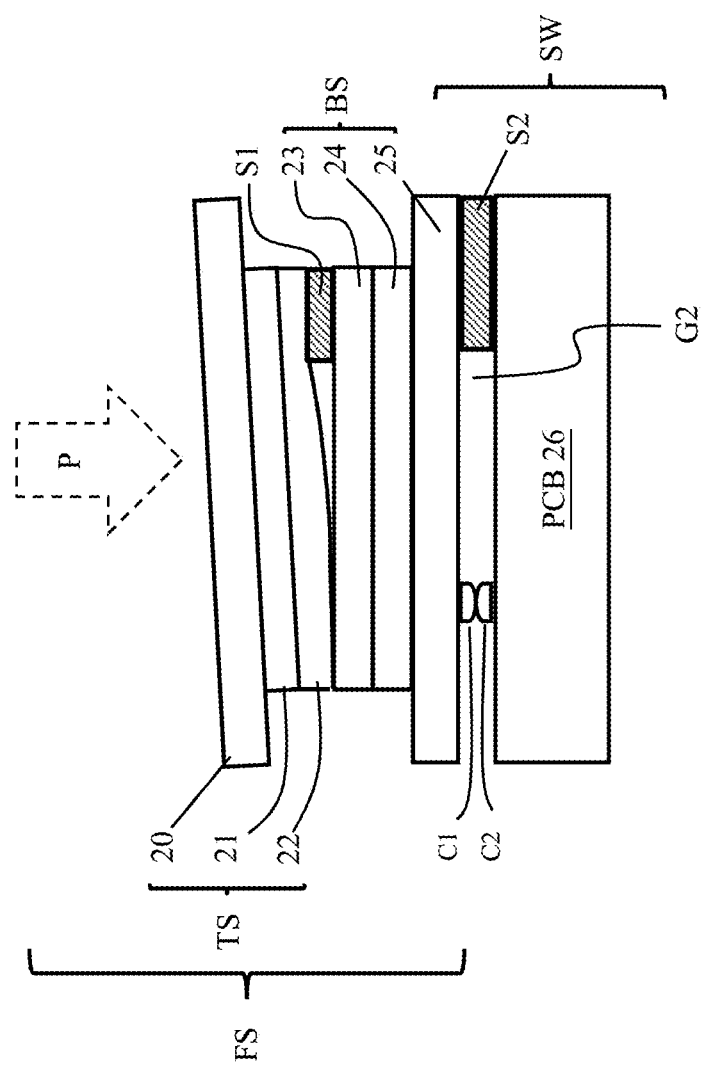

FIG. 2C shows the force sensor being depressed according to the present invention. The top stack TS moves down on its left side using the first spacer S1 as a fulcrum when the force sensor FS is depressed from the top side. After the top stack TS touches the bottom stack BS, a force signal is sent to a control center (not shown) for signal processing.

Figure 2D:
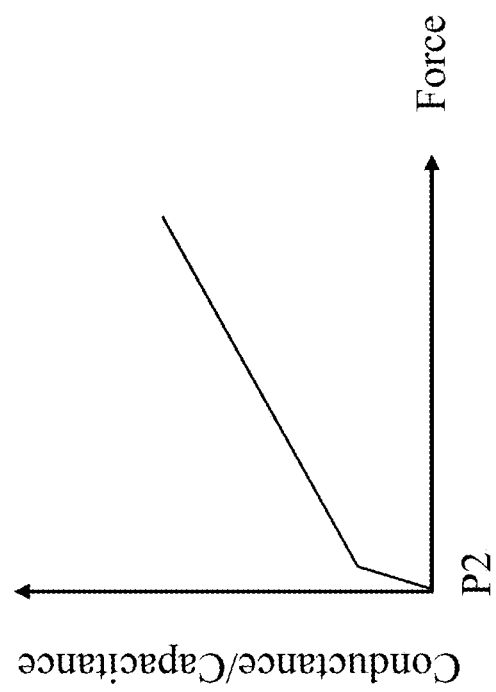

FIG. 2D shows an electrical property for the first embodiment according to the present invention. FIG. 2D shows a curve for Conductance/Capacitance vs Force for the first embodiment. Referring to FIG. 2C a status when the force sensor FS is depressed from the top side, an On-Force starts at point P2 which is extremely near to zero force point. This is because that a single side spacer S1 is configured in the right side of the force sensor FS. The cantilevered top stack TS of the force sensor FS reduces On-Force.

FIG. 3 shows the first embodiment configured in an electronic pen according to the present invention.

FIG. 3 shows that the force sensor FS with a bottom switch SW can be configured on the bottom side of the pen tip 61 of an electronic pen to sense forces coming from the pen tip 61 when the electronic pen is writing with its pen tip 61.

Figure 4B:
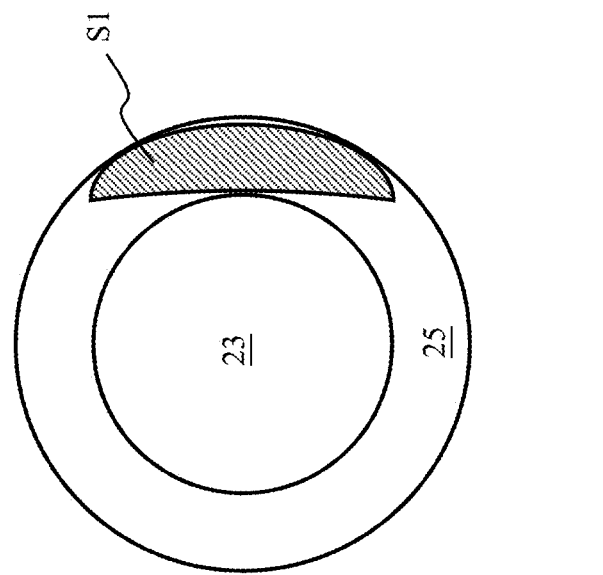
FIG. 4A~4B shows a second embodiment according to the present invention.
Figure 4A:
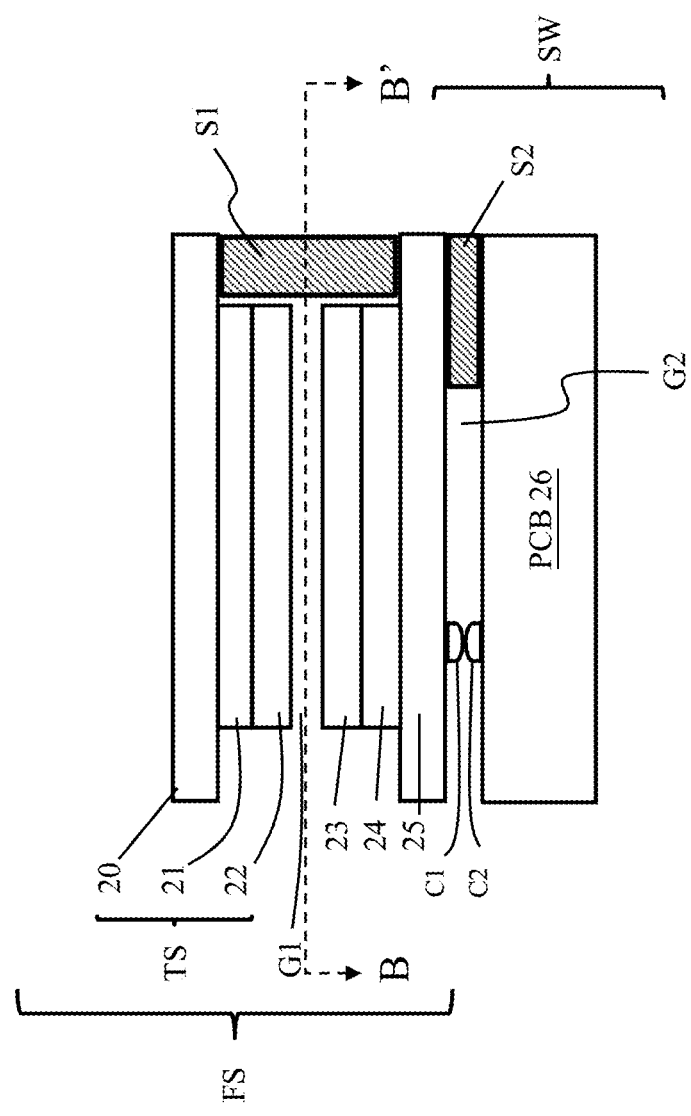

FIG. 4A~4B shows a second embodiment according to the present invention.

FIG. 4A shows a modified embodiment to the first embodiment of FIG. 2A with a different position for the first spacer S1. FIG. 4A shows that the first spacer S1 is configured between the top stack TS and the bottom stack BS and configured in the right side of the force sensor FS. The spacer S1 has a top end connected to the top substrate 20 and has a bottom end connected to the bottom substrate 25.

FIG. 4B shows a BB' section view of FIG. 4A according to the present invention. The first spacer S1 is configured in the right side of the force sensor FS, and configured between the top stack TS and the bottom stack BS.

Figure 5:
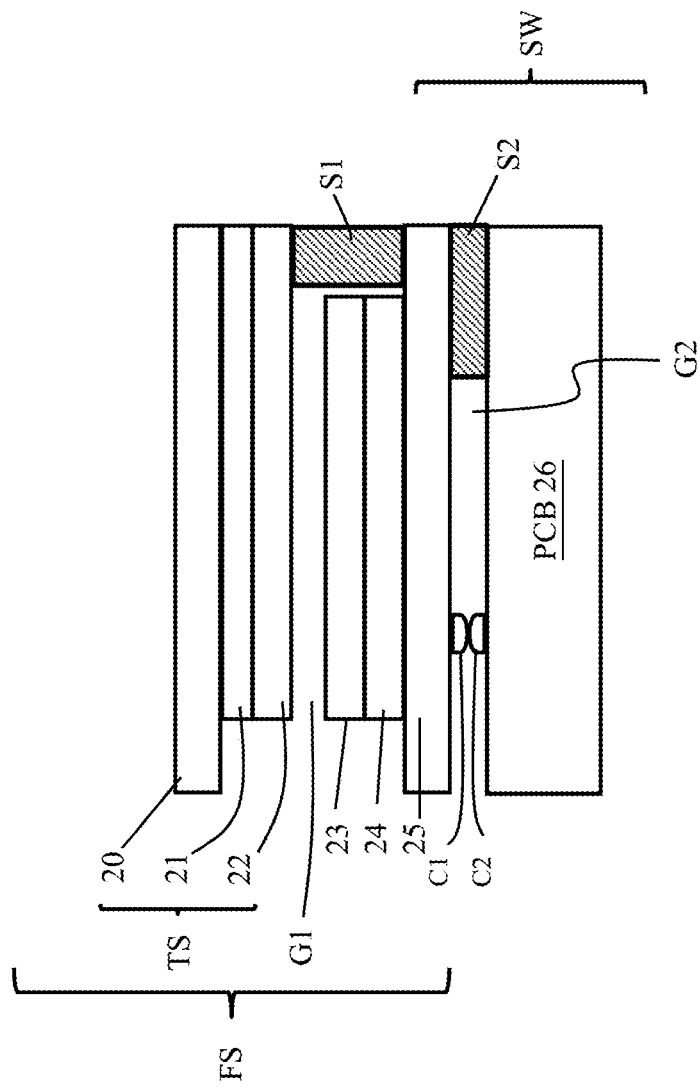
FIG. 5 shows a third embodiment according to the present invention.

FIG. 5 shows a third embodiment according to the present invention.

FIG. 5 shows a further modified embodiment to the first embodiment with a different position for the first spacer S1. The first spacer S1 is configured between the top stack TS and the bottom stack BS and configured in the right side of the force sensor FS. The spacer S1 has a top end connected to the top piezo layer 22 and has a bottom end connects to the bottom substrate 25.

Figure 6:
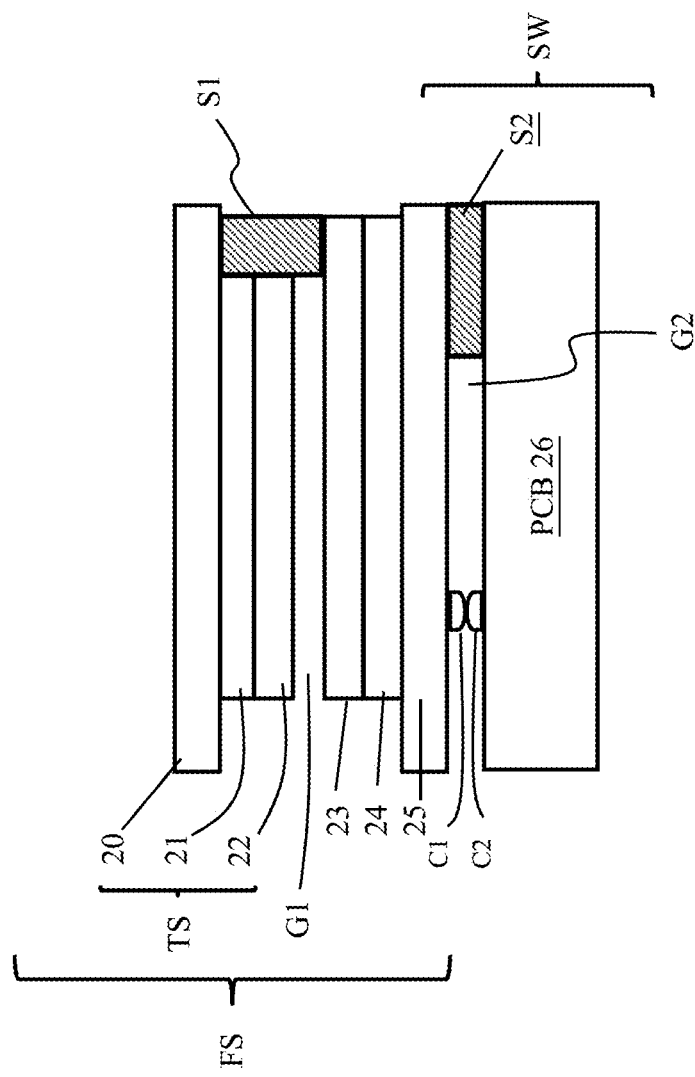
FIG. 6 shows a fourth embodiment according to the present invention.

FIG. 6 shows a fourth embodiment according to the present invention.

FIG. 6 shows a further modified embodiment to the first embodiment with a different position for the first spacer S1. The first spacer S1 is configured between the top stack TS and the bottom stack BS and configured in the right side of the force sensor FS. The spacer S1 has a top end connected to the top substrate 20 and has a bottom end connected to the bottom piezo layer 23.

Figure 7:
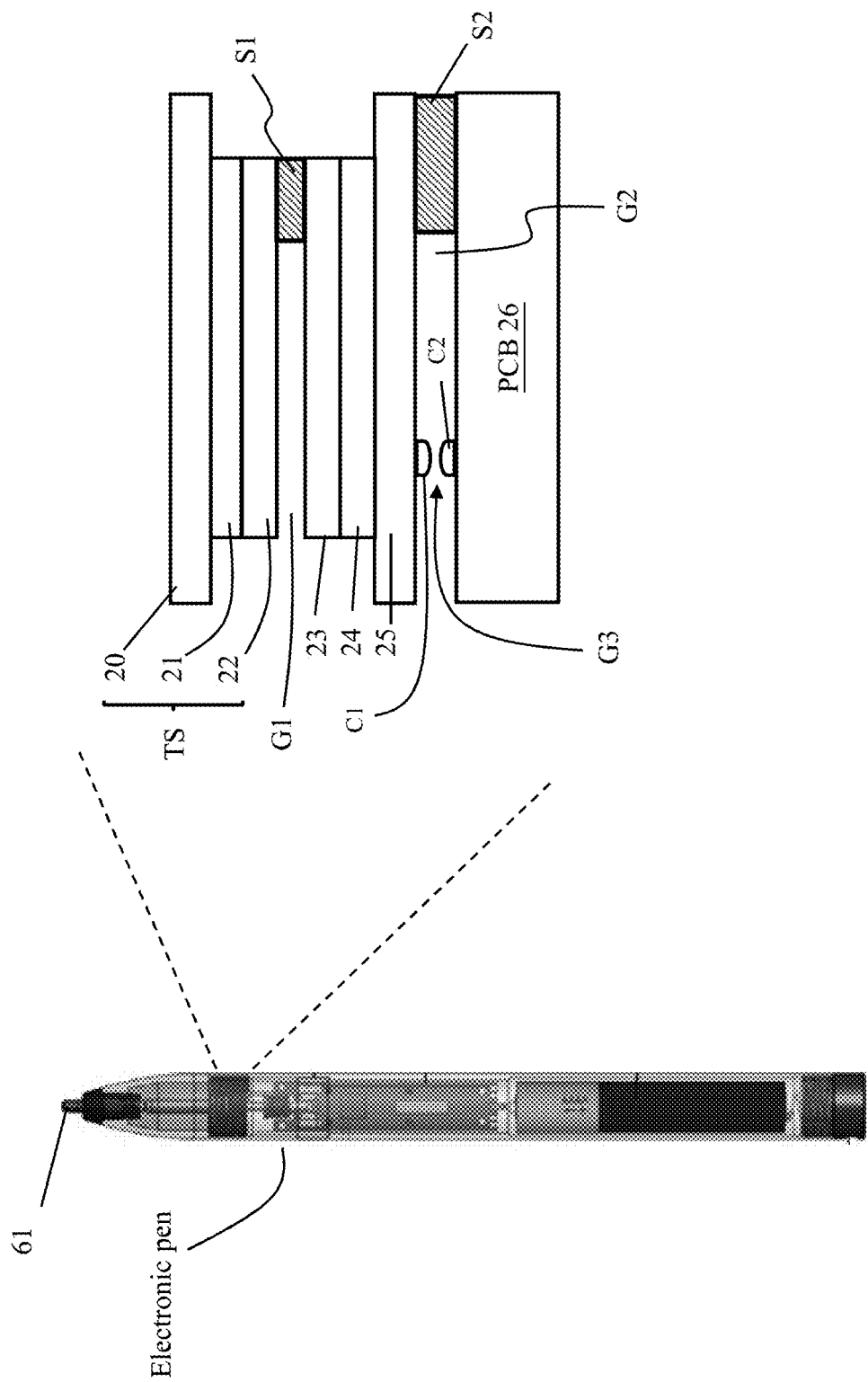
FIG. 7 shows a fifth embodiment according to the present invention.

FIG. 7 shows a fifth embodiment according to the present invention.

FIG. 7 shows a further modified embodiment of the force sensor FS with a modified bottom switch configured in an electronic pen. The force sensor FS with a bottom switch SW can be configured in the bottom side of the pen tip 61 of an electronic pen to sense forces coming from the pen tip 61 when the electronic pen is writing with its pen tip 61. The first conductive contact C1 under the force sensor FS is configured slightly apart from the second conductive contact C2. When the force sensor FS is depressed from the top side, the left side of the bottom stack BS moves down so that the first conductive contact C1 touches the second conductive contact C2 firmly to turn on the bottom switch SW. The delayed turn-on switch is designed for shielding the initial noise signal from the force sensor FS at an initial stage when the force sensor FS is depressed.

Figure 8:
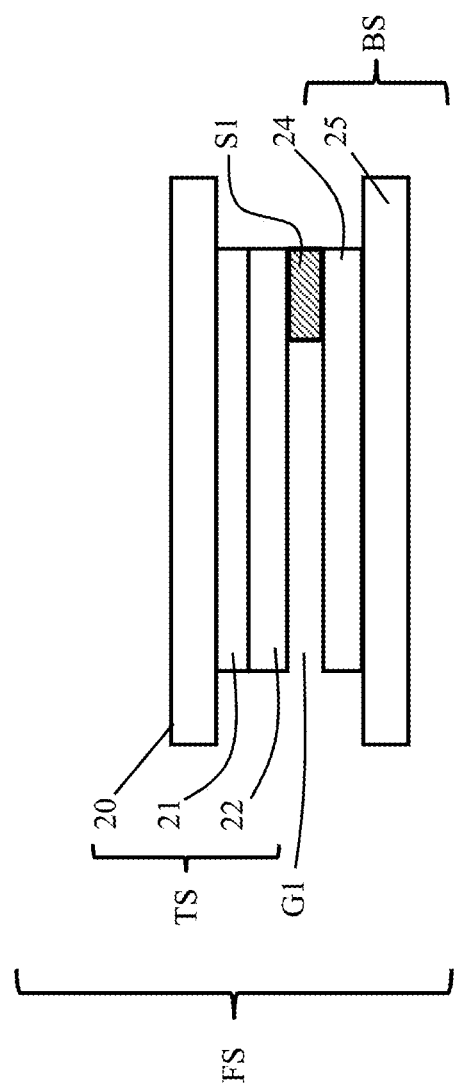
FIG. 8 shows a sixth embodiment according to the present invention.

FIG. 8 shows a sixth embodiment according to the present invention.

FIG. 8 shows a further modified embodiment to the first embodiment. A single piezo layer, a top piezo layer 22, is configured in the force sensor FS. The top stack TS is comprised of a top substrate 20, a top electrode 21, and a top piezo layer 22 in sequence. The bottom stack BS is comprised of a bottom electrode 24 and a bottom substrate 25 in sequence and without having any piezo layer configured in the bottom stack BS.

The first spacer S1 is configured between the top stack TS and the bottom stack BS and configured in the right side of the force sensor FS. A first gap G1 is configured between the top stack TS and the bottom stack BS. The first spacer S1 has a top end connected to the top piezo layer 22 of the top stack TS and has a bottom end connected to the bottom electrode 24 of the bottom stack BS.

FIG. 9 shows a seventh embodiment according to the present invention.

FIG. 9 shows a modified embodiment to the first embodiment. A single piezo layer, a bottom piezo layer 23, is configured in the force sensor FS. The top stack TS is comprised of a top substrate 20, and a top electrode 21 in sequence. The bottom stack BS is comprised of a bottom piezo layer 23, a bottom electrode 24, and a bottom substrate 25 in sequence.

The first spacer S1 is configured between the top stack TS and the bottom stack BS and configured in the right side of the force sensor FS. A first gap G1 is configured between the top stack TS and the bottom stack BS. The first spacer S1 has a top end connected to the top electrode 21 of the top stack TS and has a bottom end connected to the bottom piezo layer 23 of the bottom stack BS.

Figure 10B:
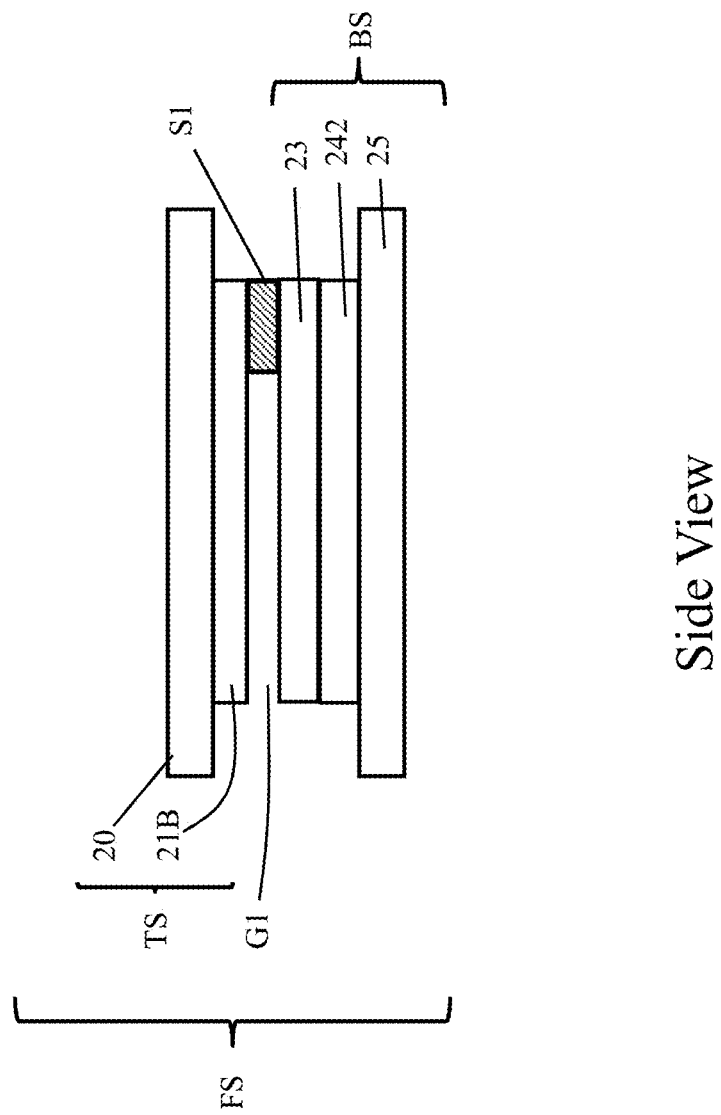

FIG. 10A~10B shows an eighth embodiment according to the present invention.

FIG. 10A shows a modified embodiment to the first embodiment. FIG. 10A shows a front view of the modified embodiment where a single piezo layer, a bottom piezo layer 23, is configured in the bottom stack BS of the force sensor FS. A pair of coplanar electrodes 241, 242 is configured on the bottom side of the bottom piezo layer 23, and the bottom substrate 25 is configured on the bottom side of the coplanar electrodes 241, 242.

The top stack TS is comprised of a top substrate 20, and an auxiliary metal 21B in sequence. The auxiliary metal 21B is an auxiliary metal for electricity conductance when the force sensor FS is depressed. The bottom stack BS is comprised of a piezo layer 23, a pair of coplanar electrodes 241, 242, and a bottom substrate 25 in sequence.

FIG. 10B shows a side view of FIG. 10A. The first spacer S1 is configured between the top stack TS and the bottom stack BS and configured in the right side of the force sensor FS. A first gap G1 is configured between the top stack TS and the bottom stack BS. The first spacer S1 has a top end connected to the auxiliary metal 21B of the top stack TS and has a bottom end connected to the bottom piezo layer 23 of the bottom stack BS.

Figure 11B:
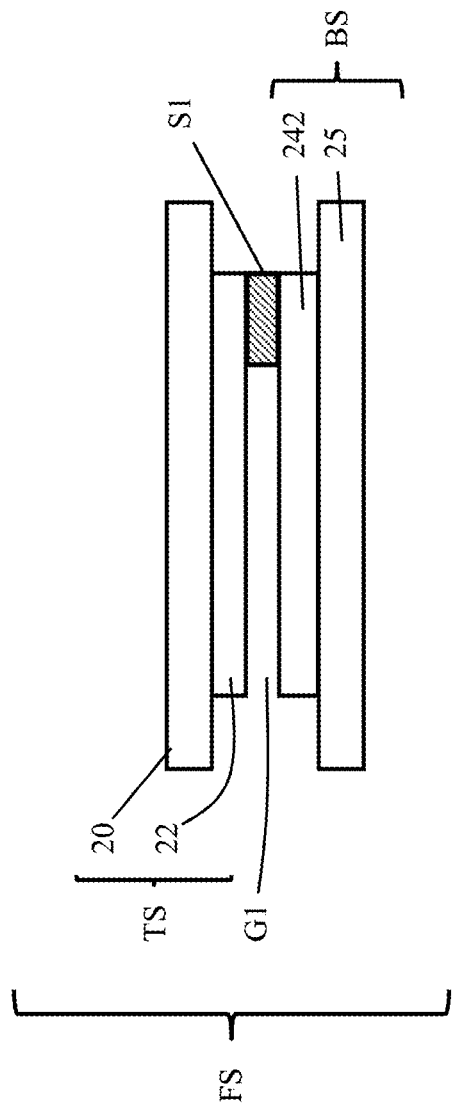

FIG. 11A-11B shows a ninth embodiment according to the present invention.

FIG. 11A shows a modified embodiment to the first embodiment. FIG. 11A shows a front view of the modified embodiment where a single piezo layer, a top piezo layer 22, is configured in the force sensor FS. A pair of coplanar electrodes 241, 242 is configured on the top side of the bottom substrate 25 of bottom stack BS in the force sensor FS.

The top stack TS is comprised of a top substrate 20 and a top piezo layer 22. The bottom stack BS is comprised of a pair of coplanar electrodes 241, 242, and a bottom substrate 25 in sequence.

FIG. 11B shows a side view of FIG. 11A. The first spacer S1 is configured between the top stack TS and the bottom stack BS of the force sensor FS. A first gap G1 is configured between the top stack TS and the bottom stack BS. The first spacer S1 has a top end connected to the top piezo layer 22 of the top stack TS and has a bottom end connected to the pair of coplanar electrodes 241, 242 of the bottom stack BS.

Figure 12A:
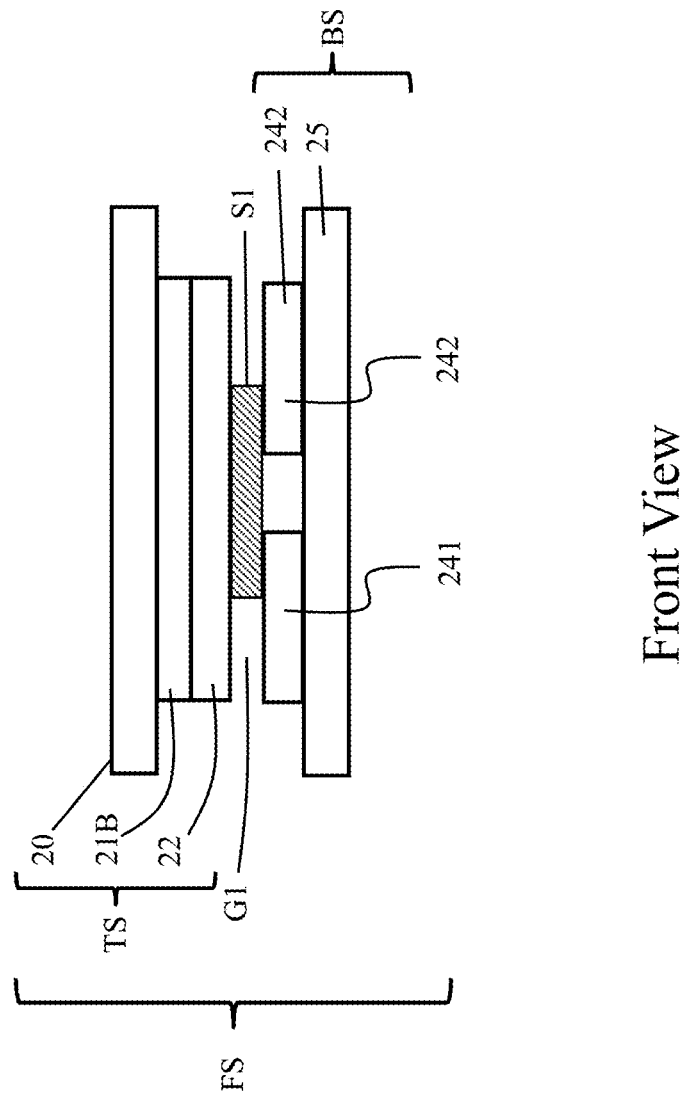

FIG. 12A~12B shows a tenth embodiment according to the present invention.

FIG. 12A shows a modified embodiment to the first embodiment. FIG. 12A shows a front view of the modified embodiment where a single piezo layer, a top piezo layer 22, is configured in the force sensor FS. A pair of coplanar electrodes 241, 242 is configured on the top side of the bottom substrate 25 of bottom stack BS in the force sensor FS.

The top stack TS is comprised of a top substrate 20, an auxiliary metal 21B, and a top piezo layer 22 in sequence. The auxiliary metal 21B is an auxiliary metal for electricity conductance when the force sensor FS is depressed. The bottom stack BS is comprised of a pair of coplanar electrodes 241, 242, and a bottom substrate 25 in sequence.

FIG. 12B shows a side view of FIG. 12A. The first spacer S1 is configured between the top stack TS and the bottom stack BS of the force sensor FS. A first gap G1 is configured between the top stack TS and the bottom stack BS. The first spacer S1 has a top end connected to the top piezo layer 22 of the top stack TS and has a bottom end connected to the pair of coplanar electrodes 241, 242 of the bottom stack BS.

Figure 13A:
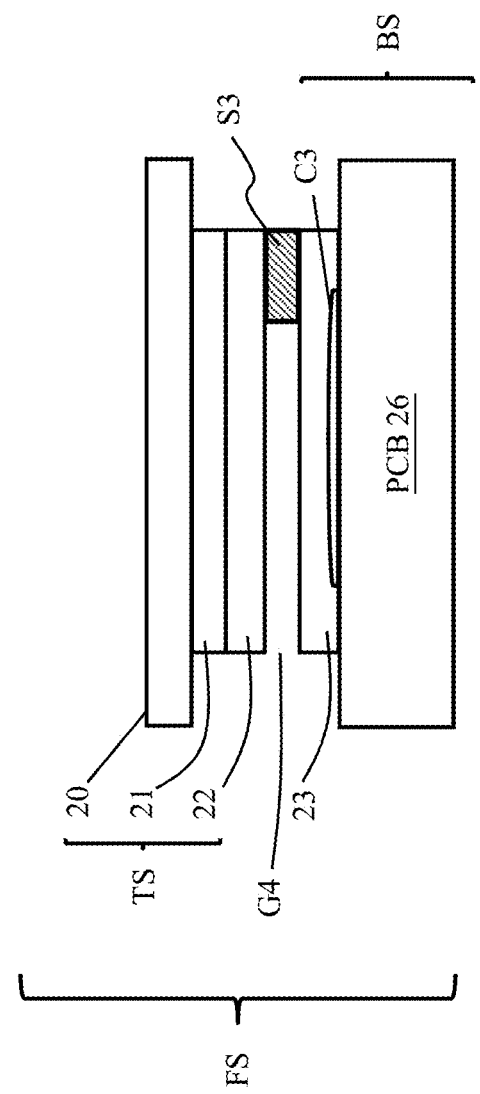
FIG. 13A~13B shows an eleventh embodiment according to the present invention.
Figure 13B:
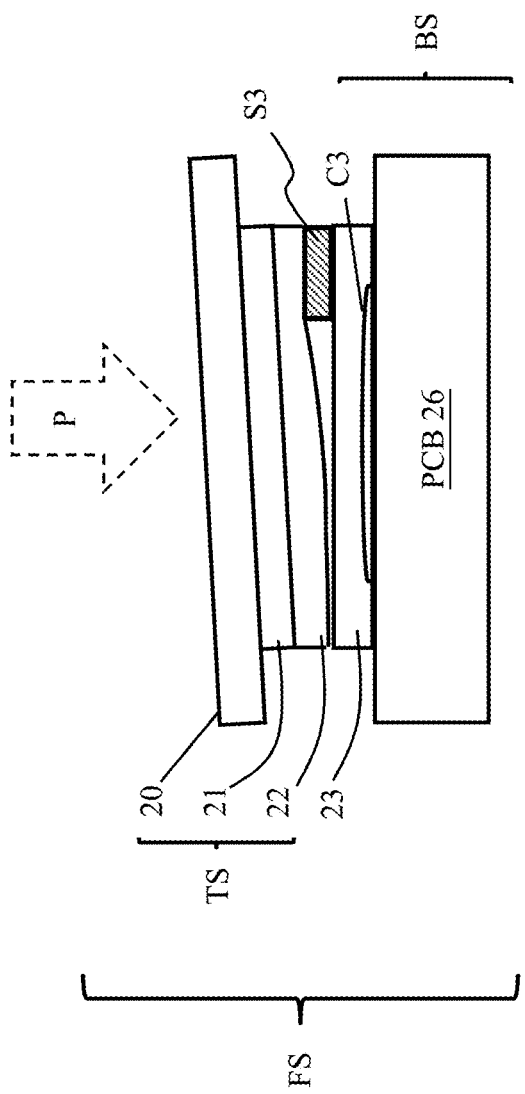

FIG. 13A~13B shows a tenth embodiment according to the present invention.

FIG. 13A shows a modified embodiment of the force sensor FS. A printed circuit board 26 is configured on the bottom side of the force sensor FS. The top stack TS is comprised of a top substrate 20, a top electrode 21, and a top piezo layer 22 in sequence. The bottom stack BS is comprised of a bottom piezo layer 23 and a printed circuit board 26 in sequence. A conductive contact C3 is configured on the top side of the printed circuit board 26. The conductive contact C3 is covered by the bottom piezo layer 23.

A third spacer S3 is configured between the top stack TS and the bottom stack BS. A fourth gap G4 is configured between the top stack TS and the bottom stack BS. The third spacer S3 is configured in the right side of the force sensor FS. The third spacer S3 and has a top end connected to the top piezo layer 22 of the top stack TS, and has a bottom end connected to the bottom piezo layer 23 of the bottom stack BS.

FIG. 13B shows a depressed status of the embodiment of FIG. 12A.

FIG. 13B shows that the left side of the top stack TS is cantilevered from the bottom stack BS. When the force sensor FS is depressed from the top side, the left side of the top stack TS moves down using the third spacer S3 as a fulcrum.

FIG. 14A~44B shows an eleventh embodiment according to the present invention.

Figure 14B:
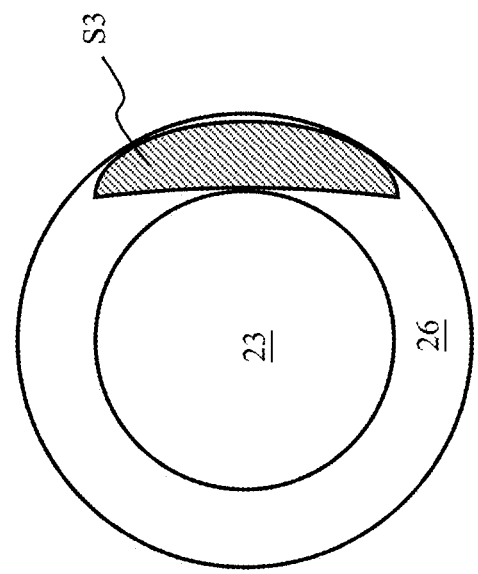
FIG. 14A~14B shows a twelfth embodiment according to the present invention.
Figure 14A:
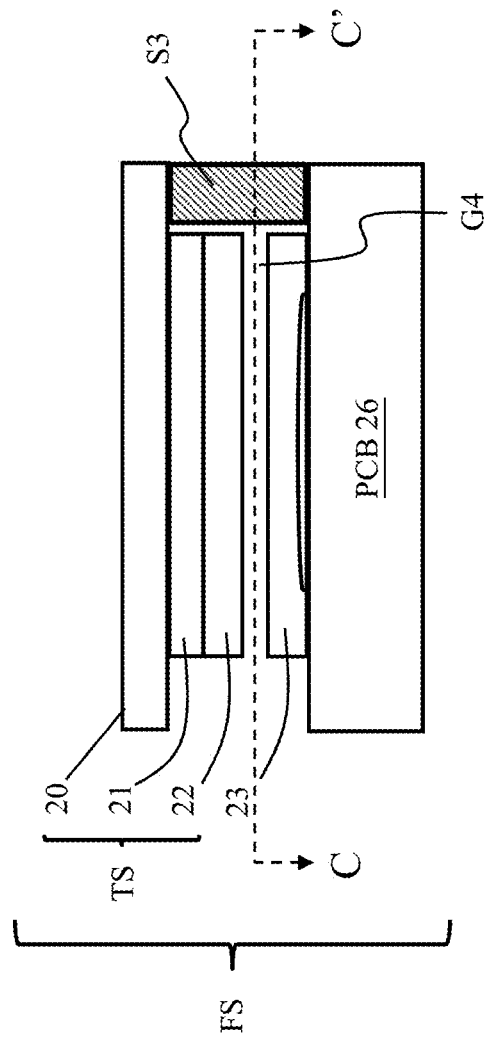

FIG. 14A shows a modified embodiment to the embodiment of FIG. 13A with a different position of the third spacer S3. The third spacer S3 is configured between the top stack TS and the bottom stack BS. A fourth gap G4 is configured between the top stack TS and the bottom stack BS. The third spacer S3 is configured in the right side of the force sensor FS. The third spacer S3 and has a top end connected to the top substrate 20 of the top stack TS, and has a bottom end connected to the printed board 26 of the bottom stack BS.

FIG. 14B shows a CC' section view of the embodiment FIG. 14A.

FIG. 14B shows that the third spacer S3 is configured in the right side of the force sensor FS.

Figure 15:
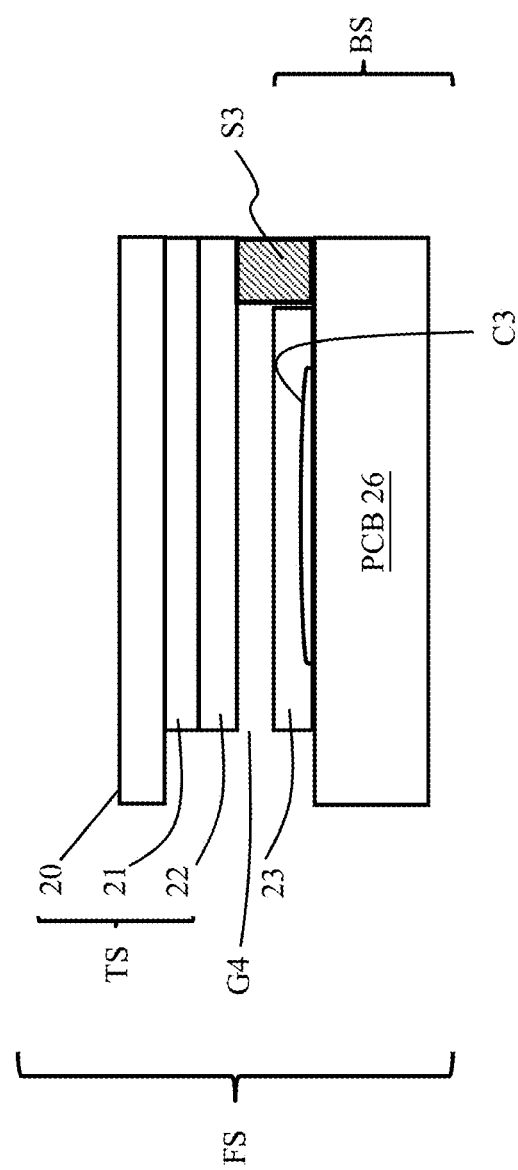
FIG. 15 shows a thirteenth embodiment according to the present invention.

FIG. 15 shows a twelfth embodiment according to the present invention.

FIG. 15 shows a modified embodiment to the embodiment of FIG. 13A with a different position of the third spacer S3. The third spacer S3 is configured between the top stack TS and the bottom stack BS of the force sensor FS. The four gap G4 is configured between the top stack TS and the bottom stack BS. The third spacer S3 has a top end connected to the top piezo layer 22 and has a bottom end connected to the printed circuit board 26. The top stack TS is cantilevered from the bottom stack BS.

Figure 16:
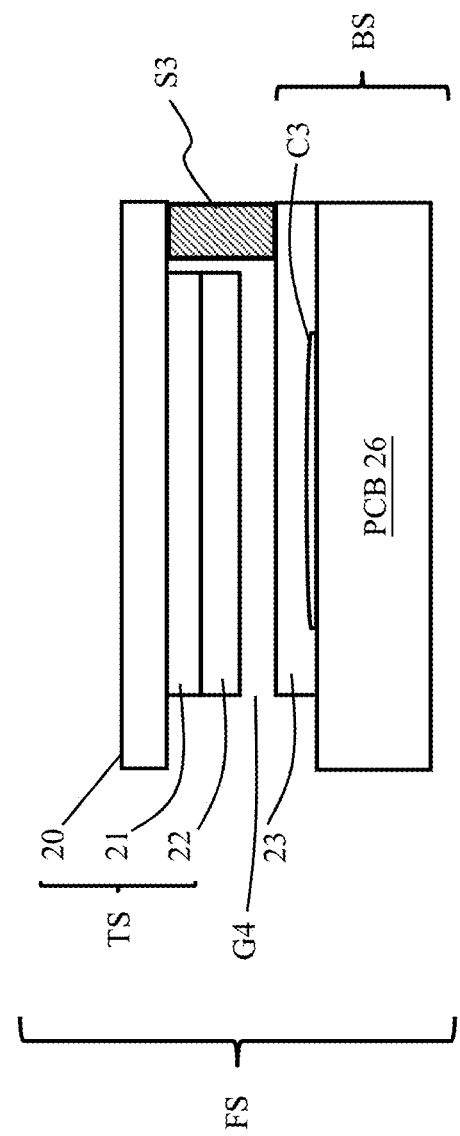
FIG. 16 shows a fourteen embodiment according to the present invention.

FIG. 16 shows a thirteenth embodiment according to the present invention.

FIG. 16 shows a modified embodiment to the embodiment of FIG. 13A with a different position of the third spacer S3. The third spacer S3 is configured between the top stack TS and the bottom stack BS and configured in the right side of the force sensor FS. The four gap G4 is configured between the top stack TS and the bottom stack BS. The third spacer S3 has a top end connected to the top substrate 20 of the top stack TS and has a bottom end connected to the bottom piezo layer 23 of the bottom stack BS. The top stack TS is cantilevered from the bottom stack BS.

Figure 17:
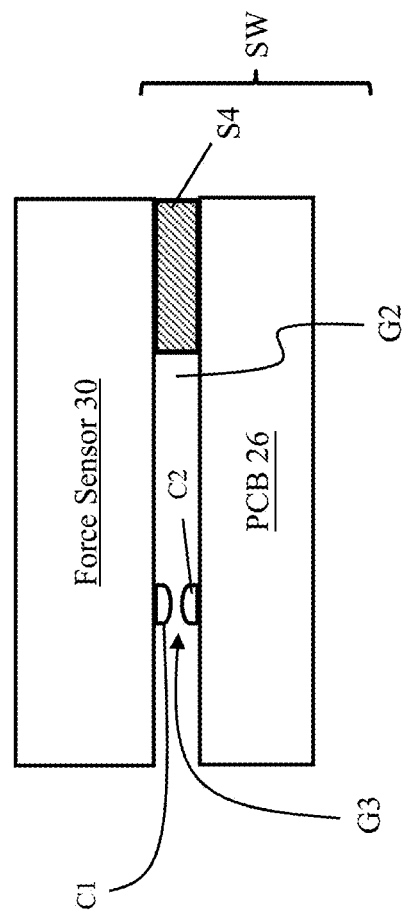
FIG. 17 shows a fifteen embodiment according to the present invention.

FIG. 17 shows a fourteenth embodiment according to the present invention.

FIG. 17 shows that a force sensor 30 is configured with a bottom switch SW. A first conductive contact C1 is configured on the bottom side of the force sensor 30. A second conductive contact C2, aligned with the first conductive contact C1, is configured on a top side of a printed circuit board 26. The force sensor 30 with the first conductive contact and the printed circuit board 26 with the second conductive contact C2 forming the bottom switch SW. The first conductive contact C1 is configured in one of the two states:

(1) slightly touching the second conductive contact C2 without turning on the bottom switch SW, and (2) slightly apart from touching the second conductive contact, and a fourth spacer S4 is configured between the force sensor 30 and the printed circuit board 26 and configured in the right side of the force sensor 30. When the force sensor 30 is depressed from the top side, the left side of the force sensor 30 moves down so that the first conductive contact C1 touches the second conductive contact C2 firmly to turn on the bottom switch SW.

The piezo layers 22, 23 disclosed in this invention is made of a material selected from the group consisting of piezoelectric material, triboelectric material, resistive material, and dielectric material While several embodiments have been described by way of example, it will be apparent to those skilled in the art that various modifications may be configured without departs from the spirit of the present invention. Such modifications are all within the scope of the present invention, as defined by the appended claims.

REFERENCE NUMBERS 20 top substrate
21 top electrode
21B auxiliary metal
22 top piezo layer
23 bottom piezo layer
24 bottom electrode
241, 242 coplanar electrodes
25 bottom substrate
26 printed circuit board
30 force sensor
61 pen tip
G1 first gap
G2 second gap
G3 third gap
G4 fourth gap
C1 first conductive contact
C2 second conductive contact
C3 third conductive contact
S1 first spacer
S2 second spacer
S3 third spacer
S4 fourth spacer
SW switch

What is claimed is:

1. A cantilever force sensor, comprising a top stack, a bottom stack, and a first spacer, wherein
 the first spacer is configured, in a thickness direction of the force sensor, between the top stack and the bottom stack, and is configured in a first side of the force sensor,
 a second side, opposite to the first side, of the top stack, is cantilevered from the bottom stack,
 in response to the top stack being depressed toward the bottom stack, the second side of the top stack moves down using the first spacer as a fulcrum,
 one of the top stack and the bottom stack is a first stack,
 another of the top stack and the bottom stack is a second stack,
 the first stack comprises:
  a first substrate,
  a first piezo layer, and
  a first electrode between the first substrate and the first piezo layer in the thickness direction, and
 along the thickness direction, all of the first substrate, the first electrode and the first piezo layer overlap the first spacer.

2. The cantilever force sensor as claimed in claim 1, wherein
 the second stack comprises:
  a second substrate,
  a second piezo layer, and
  a second electrode between the second substrate and the second piezo layer in the thickness direction, and
 along the thickness direction, all of the second substrate, the second electrode and the second piezo layer overlap the first spacer.

3. The cantilever force sensor as claimed in claim 1, wherein
 the second stack comprises a second substrate and a second electrode stacked over each other in the thickness direction, and
 in response to the top stack being depressed toward the bottom stack, the second side of the top stack moves down using the first spacer as a fulcrum and causes the second electrode to come into direct contact with the first piezo layer.

4. The cantilever force sensor as claimed in claim 3, wherein
 along the thickness direction, both the second substrate and the second electrode overlap the first spacer.

5. The cantilever force sensor as claimed in claim 1, wherein
 the first stack is the bottom stack,
 the bottom stack comprises a pair of coplanar electrodes including the first electrode and a second electrode, and
 along the thickness direction,
  the first piezo layer overlaps both the first and second electrodes, and
  the second electrode overlaps the first spacer.

6. The cantilever force sensor as claimed in claim 5, wherein
 the top stack comprises a second substrate and an auxiliary metal stacked over each other in the thickness direction, and
 in response to the top stack being depressed toward the bottom stack, the second side of the top stack moves down using the first spacer as a fulcrum and causes the auxiliary metal to come into direct contact with the first piezo layer.

7. The cantilever force sensor as claimed in claim 1, further comprising:
 a bottom switch, wherein which comprises:
  a first conductive contact configured on a bottom side of the bottom stack;
  a second conductive contact aligned with the first conductive contact, and configured on a top side of a printed circuit board; and
  a second spacer configured between the bottom stack and the printed circuit board in the thickness direction, and configured in the first side of the force sensor.

8. The cantilever force sensor as claimed in claim 7, wherein
 in a state where the top stack is not depressed toward the bottom stack, the first conductive contact slightly touches the second conductive contact without turning on the bottom switch.

9. The cantilever force sensor as claimed in claim 7, wherein
 in a state where the top stack is not depressed toward the bottom stack, the first conductive contact is slightly apart from the second conductive contact, and
 in response to the top stack being depressed toward the bottom stack, a second side opposite to the first side of the bottom stack moves down using the second spacer as a fulcrum and causes the first conductive contact to touch the second conductive contact firmly to turn on the bottom switch.

10. The cantilever force sensor as claimed in claim 1, wherein
the bottom stack comprises a printed circuit board.

11. The cantilever force sensor as claimed in claim 1, wherein
the first piezo layer is made of a material selected from the group consisting of piezo-electric material, triboelectric material, resistive material, and dielectric material.

12. The cantilever force sensor as claimed in claim 1, wherein
the second stack comprises:
a second substrate,
a second piezo layer, and
a second electrode between the second substrate and the second piezo layer in the thickness direction, and
along the thickness direction, the first spacer overlaps the second substrate, without overlapping the second electrode and the second piezo layer.

13. The cantilever force sensor as claimed in claim 12, wherein
the first stack is the top stack,
the second stack is the bottom stack, and
the second substrate is a printed circuit board.

14. A cantilever force sensor, comprising a top stack, a bottom stack, and a spacer, wherein
the spacer is configured, in a thickness direction of the force sensor, between the top stack and the bottom stack, and is configured in a first side of the force sensor,
a second side, opposite to the first side, of the top stack, is cantilevered from the bottom stack,
one of the top stack and the bottom stack is a first stack,
another of the top stack and the bottom stack is a second stack,
the first stack comprises a first substrate and a first electrode stacked over each other in the thickness direction,
the second stack comprises a second substrate and a piezo layer stacked over each other in the thickness direction, and
in response to the top stack being depressed toward the bottom stack, the second side of the top stack moves down using the spacer as a fulcrum and causes the first electrode to come into direct contact with the piezo layer.

15. The cantilever force sensor as claimed in claim 14, wherein
the first stack is the bottom stack,
the bottom stack comprises is a pair of coplanar electrodes including the first electrode and a second electrode, and
in response to the top stack being depressed toward the bottom stack, the second side of the top stack moves down using the first spacer as a fulcrum and causes the piezo layer to come into direct contact with both of the first electrode and the second electrode.

16. The cantilever force sensor as claimed in claim 15, wherein
the second stack is the top stack which further comprises an auxiliary metal between the second substrate and the piezo layer in the thickness direction.

17. The cantilever force sensor as claimed in claim 14, wherein
the second stack further comprises a second electrode between the second substrate and the piezo layer in the thickness direction.

18. The cantilever force sensor as claimed in claim 14, wherein
along the thickness direction, all of the first substrate, the second substrate, the first electrode and the piezo layer overlap the spacer.

19. A cantilever force sensor, comprising a top stack, a bottom stack, and a spacer, wherein
the spacer is configured, in a thickness direction of the force sensor, between the top stack and the bottom stack, and is configured in a first side of the force sensor,
a second side, opposite to the first side, of the top stack, is cantilevered from the bottom stack,
in response to the top stack being depressed toward the bottom stack, the second side of the top stack moves down using the spacer as a fulcrum,
the top stack comprises:
a top substrate,
a top piezo layer, and
a top electrode between the top substrate and the top piezo layer in the thickness direction,
the bottom stack comprises:
a bottom substrate,
a bottom piezo layer, and
a bottom electrode between the bottom substrate and the bottom piezo layer in the thickness direction, and
along the thickness direction, the spacer overlaps the top substrate, the bottom piezo layer and the bottom substrate, without overlapping the top electrode, the top piezo layer and the bottom electrode.

20. The cantilever force sensor as claimed in claim 19, wherein the bottom substrate is a printed circuit board.

* * * * *